Oct. 26, 1937.   J. M. G. FULLMAN   2,097,393
UNDERFLOOR DUCT
Filed Dec. 10, 1935
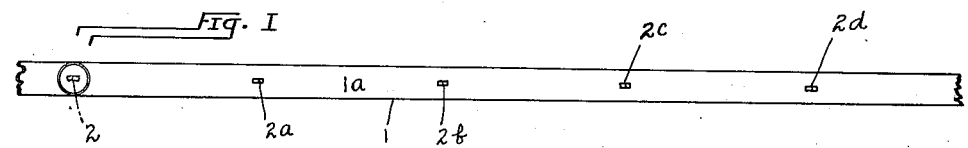
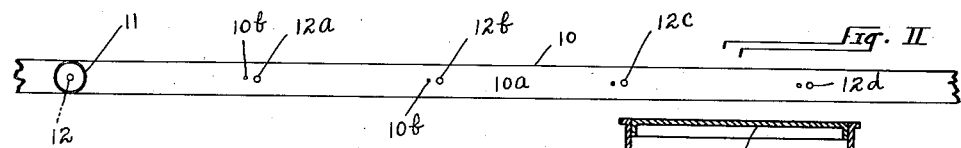
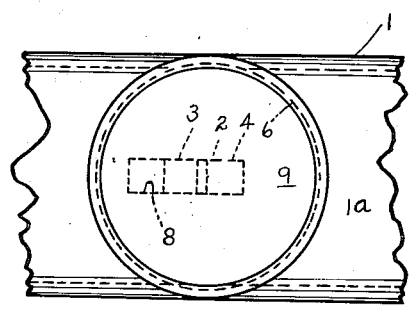
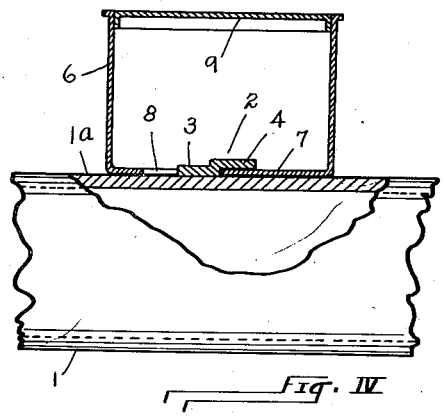
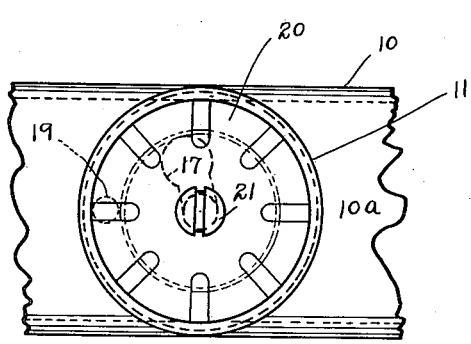
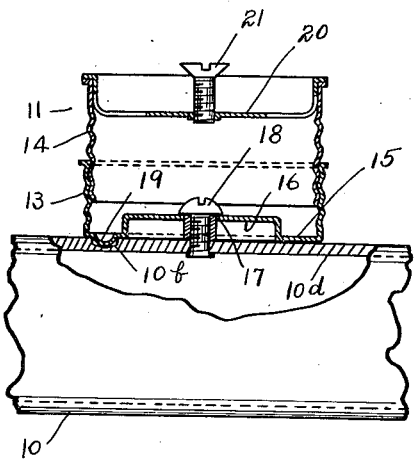
INVENTOR
James M. G. Fullman
by Christy and Wharton
his attorneys Patented Oct. 26, 1937

2,097,393

UNITED STATES PATENT OFFICE 2,097,393

UNDERFLOOR DUCT

James M. G. Fullman, Sewickley, Pa., assignor to National Electric Products Corporation, a corporation of Delaware Application December 10, 1935, Serial No. 53,762

3 Claims. (Cl. 247—28)

This invention relates to an underfloor duct for electrical conductors.

As an underfloor duct comprising one or more lengths of one-piece conduit is embedded in a floor of concrete, or similar material, it becomes from time to time necessary to obtain access to the interior of the conduit so that portions of conductors may be withdrawn therefrom at different localities to provide electrical outlet, as by connection with an electrical receptacle. In order to avoid the necessity of breaking through a substantial depth of floor material in obtaining access to the interior of the conduit, it is desirable to mount on the upper wall of the conduit some form of plug or cup which, when withdrawn or broken into, leaves through the floor material an opening exposing the upper wall of the conduit.

It is usual to manufacture one-piece conduit in lengths having attached to the upper wall thereof, at spaced intervals, the plugs or shells which are to block off access passages in the floor material when the underfloor duct so made up is embedded therein. As underfloor ducts are made up with standardized spacing of the access providing plugs or cups, it is impossible to provide specifically for the varying necessity for outlets encountered under varying conditions of duct installation. In order, therefore, that the provision for prospective outlets may be adequate, the plugs or cups are spaced at relatively short intervals upon the conduit, thus providing an underfloor duct in which adequate provision is made for establishment of outlets under any condition of duct installation, but one in which most of the outlet possibilities will never, under the conditions of duct installation, be utilized. Such structure is shown and described in United States Patent No. 1,776,656, dated September 23, 1930, to Otto A. Frederickson.

I have discovered that a less wasteful procedure may be followed in the manufacture and installation of underfloor duct. Generally stated, this procedure is to mount upon the conduit, as a step in the installation of the duct, plugs or cups, placed on the conduit only in such positions as will be probably useful in the particular location of the installation. While the work of installing the underfloor duct is thus increased, the cost of manufacturing the duct is more than proportionally decreased.

The object of my invention is to provide an underfloor duct comprising a length of duct equipped in manufacture with a plurality of spaced means for the ready engagement of cups or shells serving as access elements, together with access elements so formed, as to be readily engageable on the conduit as a step in installing the duct.

In the accompanying drawing Fig. I is a plan view of a length of underfloor duct, showing the conduit provided with spaced means capable of engaging a number of access elements in spaced position thereon, and showing one access element of the cup or shell type mounted on the conduit.

Fig. II is a similar view, but showing the conduit provided with modified means for engaging access elements thereon, and showing one access element of the shell or cup type, but of modified form, engaged on the conduit.

Fig. III is a fragmentary, plan view, showing the mounting of an access element, in the form of a closed cup, on the upper wall of a one-piece conduit, the view being an enlargement of the access element and conduit shown in Fig. I.

Fig. IV is a view of the assembly shown in Fig. III, showing the conduit, partially in elevation and partially broken away, and showing the access element of the assembly in central, vertical section.

Fig. V is a fragmentary, plan view, showing the mounting of an access element on a conduit prepared for its engagement, the view showing the application of an access element to a conduit prepared for its mounting thereon, the access element and the engaging means therefor being as shown on a smaller scale in Fig. II.

Fig. VI is a view of the assembly shown in Fig. V, the conduit being shown partially in elevation and partially broken away, and the access element of the assembly being shown in central, vertical section.

Referring initially to Figs. I, III, and IV of the drawing, reference numeral 1 designates a conduit of the one-piece type, suitable for use in underfloor ducts. On the length of conduit shown are spaced engaging members 2, 2a, 2b, 2c, and 2d, each being suitable, as the conduit is manufactured and sold, for the mounting of an appropriately constructed access element on the conduit. Each of these engaging members 2 has a base portion 3, welded, soldered, or otherwise rigidly attached to the upper wall 1a of the conduit, and a portion 4 upwardly offset from the base portion 3, to provide a tongue extending parallel to the face of the upper conduit wall 1a.

The access element comprises a cylindrical cup or shell 6, having a base or floor 7. The floor of cup 6 is provided with a slot 8, which is of a width approximating the width of the engaging member 2, carried by the conduit, and the length of which approximates that of the engaging member. With the engaging member 2 projected through slot 8 in the floor of the cup, the cup is shifted longitudinally of the conduit into the position shown in Fig. IV of the drawing, with one region of the floor 7 adjacent the slot 8 therein underlying the tongue 4 of the engaging member.

The cup 6 is shown with a cover 9 resiliently engaged therein, and presented upwardly to form an insert at the floor level, or to lie slightly below the level of the floor.

While but one of the access elements is shown as mounted on the conduit, by engagement with one of the engaging members thereof, namely, the engaging member designated by reference numeral 2, additional access elements may be mounted on any one or more of the additional engaging members 2a, 2b, 2c, and 2d. Thus, in installation of the duct, it appearing that two outlets close together will be required in a particular location of a room in the floor of which the duct is installed, two may be mounted on adjacent engaging members, such as the engaging members 2 and 2a, as a step in the installation of the duct. If the probability of needing additional outlet through the remaining length of the duct is negligible, no other access elements need be applied to the conduit through the remainder of its length. In the event that a number of outlets, spaced a relatively great distance from each other, will be conceivably desired, access elements may be mounted on separated engaging members, as, for example, on the engaging members 2 and 2d, leaving the intervening engaging members unused.

Referring to Figs. II, V, and VI, of the drawing, there is therein shown a more highly specialized form of access element of the cup or shell type, this particular form of access element being that claimed and more particularly described in my co-pending application Serial No. 53,763, filed December 10, 1935. In Fig. II the conduit is designated by reference numeral 10, and shows mounted thereon one access element 11. Fig. II also shows a plurality of mounting means 12, 12a, 12b, 12c, and 12d, each of which comprises a headed screw, headed rivet, or the like, together with an associated and longitudinally aligned hole or depression in the upper wall 10a of the duct.

Referring particularly to Figs. V and VI of the drawing, the access element comprises a cylindrical shell 13, which is bodily threaded, and a cylindrical shell 14, also bodily threaded and screwed into the shell 13. The shell 13, being the lower or conduit-engaging element of the assembly, has a lower wall or floor 15, which is centrally indented at 16 and has therein a key slot 17. The engaging member on the conduit is shown as a screw 18, so set in the upper wall 10a of the conduit that its head lies a substantial distance above the surface thereof.

In mounting this access element on a conduit, it is brought into position with the head of the screw 18 projected through the more extended region of key slot 17, and is then shifted on the conduit so that the head of the screw embraces the restricted region of the key slot. In its annular region, lying beyond the central indentation 16, the floor of shell element 13 is deformed downwardly to provide a boss 19. In the mounted position of the access element shown in Fig. VI, this boss enters the prepared hole or depression 10b in the upper wall 10a of the conduit, to prevent subsequent rotation of the access element or shifting movement of the access element along the key slot.

In preparation for use, a cover 20 is forced into resilient engagement with the upper shell element 14. Desirably, as shown, the cover 20 carries a marking screw 21, the head of which lies in a thin skin of concrete, or similar floor material, overlying the access element with its upper face flush with the level of the floor.

This more specialized form of access element may be applied to a prepared length of conduit in a manner analogous to that described for application of the form shown in Figs. I, III, and IV. That is, the access elements may be distributed selectively along the length of the conduit at certain of the points prepared for their reception, as a preparatory step in the installation of the duct, and in accordance with the probable requirements for outlets from the duct in the position in which it is installed.

I have shown my invention as applied to access elements of the cup or shell type, since the use of access elements of this type is preferable. It will be readily understood, however, that solid plugs, such as those shown in the Frederickson patent above noted, may be so formed at their lower extremity that they, similarly, may be mounted in selected position on a conduit, by interconnection with certain of the spaced engaging members thereon.

It also will be readily understood that, if, in installation, it becomes necessary to cut off short sections of the duct in order to suit its length to any particular location, the loss due to such waste is substantially less than if the conduit be equipped through its length with a plurality of spaced access elements permanently attached in manufacture to the upper wall of the conduit.

In installing underfloor duct in accordance with my invention, the labor of installation is not unduly increased. This is for the reason that the access elements may readily be slipped into position on the engaging members of the duct without performing any preparatory operation either upon the access elements or upon the conduit.

I claim as my invention:

1. In an underfloor duct assembly prepared to be embedded in cementitious floor material and of the type comprising primarily a metallic conduit and access elements adapted to provide reserved spaces in cementitious floor material embedding the duct passages leading through the floor material to the conduit; the combination of a closed metallic conduit, a plurality of engaging members for access elements mounted on the upper wall of the conduit and projected therefrom, said engaging members being arranged in predetermined longitudinally spaced relation to each other on the conduit wall, a plurality of access elements mounted on the conduit in selected dispersion by engagement individually with less than all the engaging elements mounted on the upper wall of the conduit, the upper conduit wall being closed at the unoccupied engaging members and the duct being therefore in condition suitable to be embedded in cementitious floor material, the engagement between the access elements and the conduit-mounted engaging members being by means including structure at the base of each of the access elements adapted to engage it to the conduit-mounted engaging members while such engaging members stand in mounted position on the conduit.

2. An underfloor duct assembly in accordance with the combination of claim 1 in which the means individually engaging the several access elements to the conduit-carried engaging members therefor comprises a head on each engaging member spaced from the surface of the conduit wall, and a bottom wall of the access element so slotted as to receive the head of the conduit-carried engaging member in a position in which it marginally overlies the bottom wall of the access element.

3. An underfloor duct assembly in accordance with the combination of claim 1 in which the means individually engaging the several access elements to the conduit-carried engaging members therefor comprises a head on each engaging member spaced from the surface of the conduit wall, and a resilient bottom wall of the access element so slotted to receive the head of the conduit-carried engaging member in a position in which it marginally overlies the bottom wall of the access element and in such position resiliently to bear upwardly against the head of the engaging member.

JAMES M. G. FULLMAN.